April 3, 1962 C. W. BAUGH, JR 3,028,448

TELEVISION AUTOMATIC FREQUENCY CONTROL APPARATUS

Filed Dec. 14, 1956 2 Sheets-Sheet 1

INVENTOR
Charles W. Baugh, Jr.
BY Charles F. Renz
ATTORNEY

April 3, 1962 C. W. BAUGH, JR 3,028,448

TELEVISION AUTOMATIC FREQUENCY CONTROL APPARATUS

Filed Dec. 14, 1956 2 Sheets-Sheet 2

3,028,448

TELEVISION AUTOMATIC FREQUENCY CONTROL APPARATUS

Charles W. Baugh, Jr., Montgomery Township, Somerset County, N.J., assignor to Westinghouse Electric Corporation, East Pittsburgh, Pa., a corporation of Pennsylvania Filed Dec. 14, 1956, Ser. No. 628,385
6 Claims. (Cl. 178—5.8)

This invention relates generally to television receivers and more particularly, to automatic frequency control systems for them.

In standard television systems, it is the practice to transmit the picture signals on one carrier wave and to transmit the complementary sound signals on an adjacent carrier wave.

In a television receiver of the type utilizing an intercarrier sound system, the picture and sound intermediate frequency signals are amplified in the same intermediate frequency amplifier, and an intercarrier sound signal is derived by heterodyning the picture and sound intermediate frequency signals. The intercarrier sound frequency corresponds to the difference between the picture and sound carrier frequencies and in standard television systems, is 4.5 megacycles.

It has been the practice in the design of a television receiver of the intercarrier sound type to employ some sort of attenuation circuits to control the sound carrier level relative to the picture carrier level. These attenuation circuits, although helping to shape the over-all picture intermediate frequency response curve, are essentially provided to prevent beats in the second detector between the sound carrier and high frequency video components in a monochrome video receiver. In a single second detector type of color television receiver, an even greater attenuation is usually required at the accompanying sound carrier frequency to prevent beats between the color components and the sound carrier.

It is highly desirable that the frequency of the local oscillator in both monochrome and color television receivers be controlled in order to control the frequency of the intermediate frequency sound signal to effect adequate rejection to the accompanying sound carrier by the attenuation circuits. In the prior art, various systems utilizing conventional frequency discriminators have been proposed for providing frequency control of the sound intermediate frequency. This type of control is not entirely satisfactory since there is a tendency for a conventional frequency discriminator control to drift in frequency relative to the operating frequency of the attenuation circuit.

In a television intercarrier sound receiver, if local oscillator drift takes place, the 4.5 mc. intercarrier sound signal remains unchanged in frequency, but the intermediate frequency sound signal may fall on a portion of the intermediate frequency response curve where the attenuation is not satisfactory. Also, if local oscillator drift allows the video intermediate frequency carrier to move from its correct position on the intermediate frequency response curve slope, proper vestigial sideband reception will not be achieved and poor picture quality will result.

In present monochrome and color television receivers, it has generally been found necessary for satisfactory sound and color-sound performance respectively to provide a fine tuning control knob on the front panel of the receiver to make a precise adjustment of the frequency of the local oscillator. In a color television receiver, the fine tuning control knob is usually required to compensate for 900 kc. beat between the color subcarrier and the sound carrier and to keep the color response at a satisfactory level. If the intermediate frequency sound signal is properly attenuated in the intermediate frequency stage of the receiver then the color subcarrier, being near to the intermediate frequency sound carrier, will be highly sensitive by reason of its position near the rapidly falling portion of the frequency response characteristic of the intermediate frequency passband. Hence, fine tuning is needed to ensure that the color subcarrier lies on the correct point of the frequency response characteristic to achieve the desired transient response.

It is, therefore, an object of the present invention to improve the performance and reduce the cost of television receivers.

It is another object of the present invention to provide an improved control system for a television receiver which combines automatic frequency control and automatic level control for the sound signal.

It is a further object of this invention to provide an automatic frequency control system for a television receiver which provides automatic receiver tuning.

A still further object of this invention is to provide an automatic control system for an intercarrier type television receiver which makes use of the level of the intercarrier sound wave to control the frequency of a local oscillator.

A still further object of this invention is to provide an automatic control system for an intercarrier type television receiver which makes use of the level of the intercarrier sound signal to effect control of the level of the intermediate frequency and sound subcarrier wave.

A still further object of this invention is to provide a tuning control system for a television receiver which does not require a separate fine tuning control knob.

A still further object of this invention is to provide an automatic frequency control system for an intercarrier sound type television receiver in which the control signal is provided by the sound system of the receiver.

A still further object of this invention is the provision of an automatic frequency control system for a color television receiver which provides for automatic level control of the sound signal and the color signal.

A feature of this invention is the provision of a television receiver in which the frequency of the tuner oscillator is controlled by a signal which varies as a function of the amplitude of the intercarrier sound signal.

Another feature of this invention is the provision of an automatic frequency control system which allows a color television receiver to be designed with a single second detector without compromise in its performance.

Further objects, features and advantages will be apparent from a consideration of the following description taken in accordance with the accompanying drawings, in which.

The present invention provides an automatic frequency control system which utilizes the 4.5 mc. intercarrier sound signal as it exists in the sound channel of the receiver. The receiver has an intermediate frequency circuit with a desired frequency response characteristic. The level of the intercarrier sound signal is a function of the positions of the intermediate frequency video and sound modulated waves with respect to the desired frequency response characteristic of the intermediate frequency circuit. The automatic frequency control system utilizes the level of the intercarrier sound signal to produce a control signal whenever the intermediate frequency video and sound modulated waves depart from predetermined positions with respect to the intermediate frequency circuit's desired response characteristic. This control signal is utilized to control the frequency of the local oscillator of the receiver to provide automatic receiver tuning so as to maintain the ratio of the picture and sound carriers substantially constant. The feasibility of using an amplitude controlled automatic frequency control system depends on having a nominally constant level of sound due to gain control on the signal produced by a conventional automatic gain control system.

Figure 1:
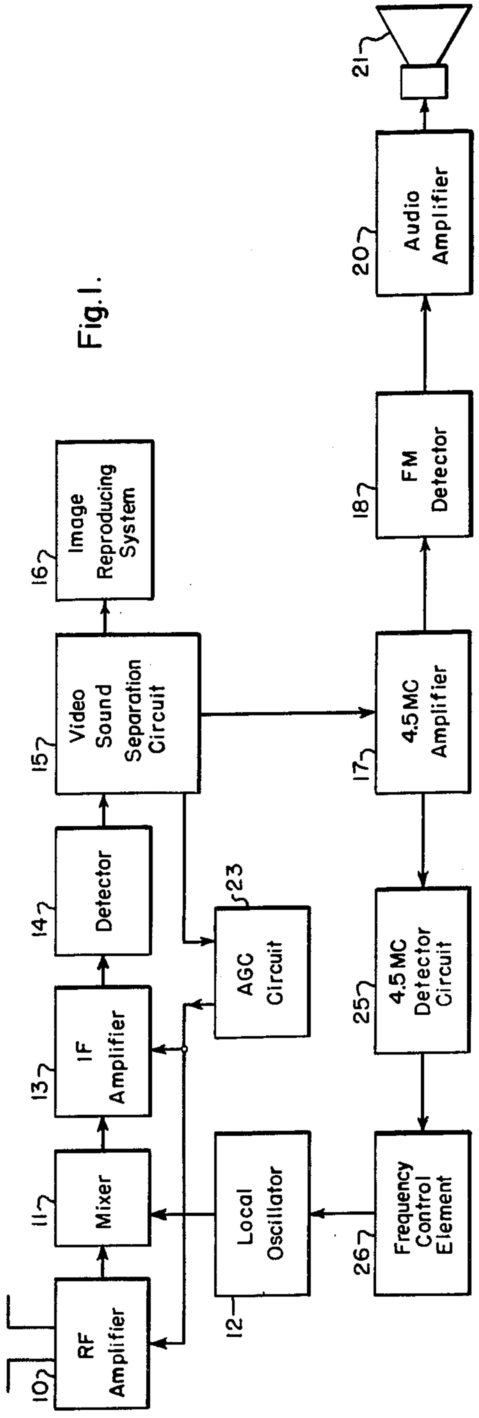
FIGURE 1 is a block diagram of a television receiver embodying the automatic frequency control system of my invention.

Referring in detail to FIG. 1, a radio frequency amplifier 10 supplies both the sound and picture radio frequency carriers to a mixer 11. In accordance with present-day standards, these carriers are separated by 4.5 mc. The output of a local oscillator 12 is coupled to the mixer or first detector 11 and the beat frequencies produced by the heterodyning action within the mixer 11 includes the picture intermediate frequency carrier and the sound intermediate frequency carrier. The picture and sound intermediate frequencies are applied to a common intermediate frequency amplifier 13, wherein signals within a predetermined frequency range defined by the passband of the intermediate frequency amplifier are amplified. The picture and sound intermediate frequencies are applied to second detector 14 wherein the picture signals are derived from the picture intermediate frequency and the picture and sound intermediate frequency waves are heterodyned to provide an intercarrier sound wave. The video and intercarrier waves are applied to video-sound separation circuit 15 which separates the video and intercarrier sound signals. The video signals are applied to a suitable image reproducing system 16.

The intercarrier sound signal is applied to 4.5 mc. amplifier 17 in the sound channel of the receiver wherein it is amplified. The sound channel may comprise a frequency-modulation detector 18 and an audio amplifier 20. The output of the audio amplifier is connected to sound-reproducing device 21.

The output from the video-sound separation circuit 15 is also connected to an automatic gain control circuit 23 which acts in a well-known manner to control the amplification of the high frequency stages 10 and 13 in accordance with the intensities of received television signals.

The intercarrier sound signal from the amplifier 17 is also applied to a 4.5 mc. detector circuit 25, which may be included in the frequency modulation detector 18, and which produces a direct-current control signal, the magnitude of which varies as a function of the amplitude of the intercarrier sound signal. The output of the detector circuit 25 is applied to a frequency control element 26 which in turn controls the frequency of the local oscillator 12. The frequency control element 26 may comprise a diode which, in series with a condenser, is connected across the tank circuit of the oscillator 12, shunting a variable reactance across the tank and hence changing the frequency of the local oscillator. This variation of reactance is accomplished by varying the effective load applied to the diode to control its conduction.

Figure 2:
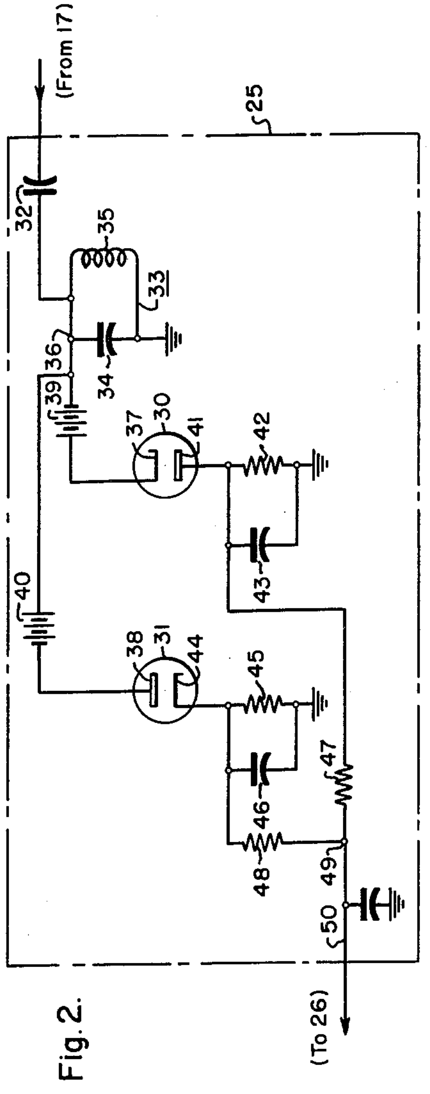
FIG. 2 is a schematic diagram of the detector circuit employed in the diagram of FIG. 1.

The detector circuit 25 of FIG. 1 may comprise the circuit, as shown in FIG. 2. As may be seen, the detector circuit 25 comprises two electron discharge devices, shown as diodes 30 and 31 by way of illustration. The electrodes of the pair of diodes may be housed within a common tube envelope, or they may be located in separate envelopes. The intercarrier sound signal from the amplifier 17 is passed through a coupling condenser 32 to a resonant circuit 33 comprising a condenser 34 and a coil 35. The resonant circuit 33 is tuned to maximize the 4.5 mc. intercarrier sound signal at the point 36. The 4.5 mc. intercarrier sound signal from the resonant circuit 33 is applied to the cathode 37 of diode 30 and also to the anode 38 of diode 31. The cathode 37 of the diode 30 is connected to the positive terminal of a direct-current voltage source, which is represented by the battery 39. The plate 38 of the diode 31 is connected to the negative terminal of a direct-current voltage source, which is represented by the battery 40. The reason for the voltage sources 39 and 40 will hereafter be explained when the operation of the detector circuit 25 is explained.

The diode 30 has in circuit with its anode 41 a resistor 42 which is connected to ground potential. Resistor 42 is shunted by a condenser 43. The diode 31 has in circuit with its cathode 44, a resistor 45 which is connected to ground potential. Resistor 45 is shunted by a condenser 46. The anode 41 is connected to the cathode 44 by means of a pair of resistors 47 and 48. The value of the resistor 47 is greater than the value of the resistor 48 so that the effect of diode 31 will be to predominate over the effect of diode 30 when both the diodes are conducting. Output is taken from the junction 49 of resistors 47 and 48 via lead 50 and is applied to the frequency control element 26. This output comprises a direct-current voltage whose magnitude varies as a function of the amplitude of the intercarrier sound signal.

Figure 3:
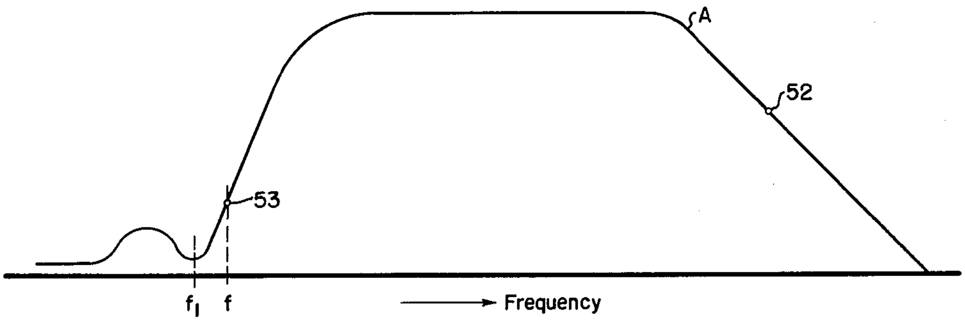
FIGS. 3 and 4 are curves helpful in explaining the invention.

Referring now to FIG. 3, there is illustrated the bandpass of a suitable intermediate frequency amplifier having a frequency response characteristic indicated by the curve A. On curve A, point 52 represents the video carrier frequency, which is approximately 6 decibels below the maximum level, and point 53 represents the center frequency of the sound signals which is attenuated by about 30 decibels below maximum level. The amplitude of the intercarrier sound wave is largely determined by the sound carrier amplitude which is indicated by the ordinate of point 53. The frequency response characteristic of the intermediate frequency amplifier has a steep slope in the vicinity of the intermediate frequency sound carrier produced by an attenuation circuit or trap for the intercarrier sound wave.

If the positions, such as at 52 and 53, respectively, of the intermediate frequency video and sound waves are shifted with respect to the frequency response characteristic of the intermediate frequency amplifier 13, the amplitude of the intercarrier sound wave will vary. In accordance with the invention, the amplitude of the intercarrier sound wave is utilized to produce a control signal whenever the intermediate frequency video and sound waves substantially depart from predetermined positions, such as at 52 and 53, respectively. The control signal is utilized to effect control of the frequency of the local oscillator 12. The frequency control system of this invention is not limited to a receiver having the intermediate frequency passband and frequency response characteristic shown in FIG. 3, and for example, it can be used with a color television receiver having different passband requirements.

Figure 4:
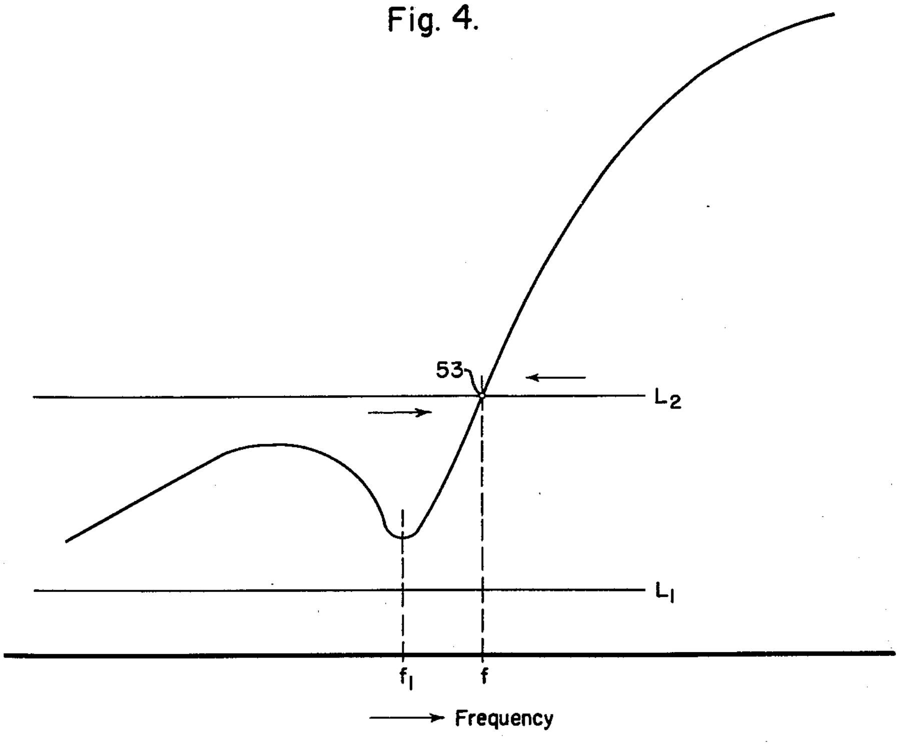

In the vicinity of point 53 of FIG. 3, the intermediate frequency response characteristic is representative of the variation in level of the 4.5 mc. intercarrier sound wave in relation to the frequency of the local oscillator 12. FIG. 4 is an enlarged view of that portion of the intermediate frequency response characteristic in the vicinity of point 53.

Referring in detail to FIG. 4, if the frequency of the local oscillator 12 is less than a nominal value $f$ that corresponds to an intermediate frequency sound carrier, then the level of the intercarrier sound signal will be less than the level $L_2$ and greater than the level $L_1$. The intercarrier sound signal will cause the low level diode 30 alone to conduct and a control signal will be developed in the detector circuit 25 to cause the frequency control element 26 to control the local oscillator 12 so as to increase the frequency of the local oscillator 12. Thus, the frequency of the intermediate frequency sound carrier will increase in the direction of the nominal value $f$. If the frequency of the local oscillator 12 is greater than the nominal value $f$, then the level of the intercarrier sound signal will be greater than the level $L_2$. The intercarrier sound signal will cause both the low level and the high level diodes 30 and 31, respectively, to conduct. Diode 31 will take control away from the diode 30. The polarity of the signal output of the high level diode circuit is such as to subtract from the signal output of the low level diode circuit. A control signal will be developed in the detector circuit 25 to cause the frequency control element 26 to control the local oscillator 12 so as to decrease the frequency of the local oscillator 12. Thus, the frequency of the intermediate frequency sound carrier will tend to remain at the nominal value $f$.

In FIGS. 3 and 4, the attenuation circuit or trap is tuned to a frequency $f_1$, which is lower than the nominal frequency $f$. It can be seen that the diodes 30 and 31 are back-biased by different amounts by the voltage sources 39 and 40, respectively, to keep the intercarrier sound signal at approximately a constant level by the action of the automatic frequency control loop.

From the foregoing description, it will be seen that if the positions of the intermediate frequency video and sound waves change, with respect to the frequency response characteristic of the intermediate frequency amplifier 13, then the level of the intercarrier sound signal will also change. The output of the detector circuit 25 will cause the frequency control element 26 to change the frequency of the local oscillator 12 to place the intermediate frequency video and sound waves at the desired positions, with respect to the intermediate frequency characteristic. The action of the automatic frequency control system will also tend to maintain the level of the intercarrier sound signal constant. Since the automatic gain control circuit 23 keeps a constant level of video signal at the detector 14, the relative sound-to-video carrier ratio at the detector 14 is fixed.

It will be apparent from the above description of my automatic gain control system that it is especially suitable for use in a color television receiver. There are two general second detector systems commonly used in color television receivers. One has a single second detector for recovering the monochrome, color and sound signals. The other second detector system uses two second detectors, one for recovering the monochrome signal, the other for recovering the color and sound signals. The common disadvantage of a single second detector color receiver is its sensitivity to tuning. It is difficult to tune to remove 900 kc. beat between the color subcarrier and the sound carrier, and local oscillator drifts detune the receiver, making it necessary to retune. The simultaneous presence of color and sound signals at the second detector produces beat frequencies of about 900 kc. and 8.1 mc. The high frequency beat is easily filtered out since no picture information exists at that frequency, but the 900 kc. beat in monochrome channel exists with the monochrome signal and is difficult to attenuate. This 900 kc. signal must be attenuated or else it will cause an objectionable interference in the viewed picture. In practice, with the sound tuned in the attenuation circuit the over-all sound attenuation at the monochrome detector is much greater than required to prevent an objectionable 900 kc. beat. This is desirable so that frequency drift in the tuner oscillator does not allow the sound to come out of the attenuation circuit far enough to cause an objectionable beat.

At the chroma-sound detector of a two detector receiver, the presence of a small amount of 900 kc. beat is not objectionable since it is different in frequency than either the chroma or sound frequencies and is easily filtered out.

In a single second detector color receiver, if the sound attenuation is great enough, so that considering drifts in the local oscillator it is sufficient, then on weak signals the sound performance is compromised.

My automatic frequency control system thus allows a color television receiver to be designed with one second detector without comprise in performance. In addition, the frequency drift of the local oscillator is automatically controlled. A further consequence of use of my A.F.C. system in a color television receiver is the effective automatic level control on the sound signal. This controls the 900 kc. beat and allows operation of sound at a level which does not compromise sound performance.

While one embodiment of the invention has been described for purposes of illustration, numerous modifications falling within the spirit and the scope of the invention will be readily apparent to those skilled in this art after the benefit of the above teachings has been obtained.

I claim as my invention:

1. In a television receiver for receiving television signals consisting of a video modulated carrier wave of a first frequency and an associated sound modulated carrier wave of a second frequency having a predetermined relation to said first frequency, and in which the output of a local oscillator is heterodyned with said carrier waves so as to develop a separate intermediate frequency wave for each of said carrier waves, a receiver circuit having a predetermined frequency response characteristic, means for heterodyning said intermediate frequency waves to produce an intercarrier sound wave having an amplitude varying as a function of the positions of said intermediate frequency waves with respect to said predetermined frequency response characteristic, detector means coupled to said heterodyning means for producing an output of one polarity when said intercarrier wave exceeds a first amplitude level, separate detector means for producing an output of a different polarity when said intercarrier wave exceeds a second amplitude level, means connected between the aforesaid output of each of said detector means to combine said outputs and to produce a control signal which varies as a function of the amplitude of said intercarrier sound wave, and means for controlling the frequency of said local oscillator in response to said control signal.

2. In a television receiver for receiving television signals consisting of a video modulated carrier wave of a first frequency and an associated sound modulated carrier wave of a second frequency having a predetermined relation to said first frequency, and in which the output of a local oscillator is heterodyned with said carrier waves so as to develop a separate intermediate frequency wave for each of said carrier waves, an intermediate frequency receiver circuit having a predetermined frequency response characteristic, means for heterodyning said intermediate frequency waves to produce an intercarrier sound wave having an amplitude varying as a function of the positions of said intermediate frequency waves with respect to said predetermined frequency response characteristic, a first diode detector having a cathode to which said intercarrier wave is applied, means for reverse biasing said first diode detector, said intercarrier wave and said biasing means being operable to cause said first diode detector to conduct and produce an output of one polarity when said intercarrier wave reaches a first amplitude, a second diode detector having an anode to which said intercarrier wave is applied, means for reverse biasing said second diode detector to an extent such that, said second diode detector conducts only in response to intercarrier waves exceeding a second amplitude level to produce an output of a different polarity, an output means including impedance means connected between the aforesaid output of each of said first and second diode detectors to combine said outputs and to produce a control signal which varies as a function of the amplitude of said intercarrier sound wave, and means for controlling the frequency of said local oscillator in response to said control signal to thereby reduce departures of said intermediate frequency waves from desired positions on said predetermined frequency response characteristic.

3. In a television receiver for receiving television signals consisting of a video modulated carrier wave of a first frequency and an associated sound modulated carrier wave of a second frequency having a predetermined relation to said first frequency, and in which said waves are heterodyned to provide an intercarrier sound wave having an amplitude varying as a function of the amplitude of said carrier waves, means responsive to said intercarrier wave for deriving a first voltage which varies as a function of intercarrier signal amplitudes within a predetermined amplitude range defined by first and second amplitude levels, means for deriving a second voltage which varies as a function of intercarrier signal amplitudes exceeding said second amplitude level, means for subtractively combining said first and second voltages to produce a control signal which varies as a direct function of intercarrier signal amplitudes within said predetermined range and as an inverse function of amplitudes exceeding said second level, heterodyning means including a tunable oscillator for converting said video and sound modulated carrier waves to intermediate frequency video and sound signals, and means connected between said combining means and said tunable oscillator for applying said control signal to said oscillator to dynamically stabilize said oscillator at a frequency such that the amplitude of said intercarrier signal is maintained substantially at said second amplitude level.

4. In a television receiver for receiving television signals consisting of a video modulated carrier wave of a first frequency and an associated sound modulated carrier wave of a second frequency having a predetermined relation to said first frequency, and in which means comprising a local oscillator is utilized for converting said carrier waves to intermediate frequency picture and sound signals, and in which said intermediate frequency signals are heterodyned to provide an intercarrier sound wave having an amplitude varying as a function of the amplitude of said carrier waves, means for deriving a first voltage which varies as a function of intercarrier signal amplitudes within a predetermined amplitude range defined by first and second amplitude levels, means including a reversed biased rectifier for deriving a second voltage which varies as a function of intercarrier signal amplitudes exceeding said second amplitude level, means for combining said first and second voltages to produce a control signal which varies as a first function of intercarrier signal amplitude variations within said predetermined range and as a different function of amplitude variations exceeding said second level, and means for applying said control signal to stabilize the frequency of said local oscillator.

5. In a television receiver for receiving television signals consisting of a video modulated carrier wave of a first frequency and an associated sound modulated carrier wave of a second frequency having a predetermined relation to said first frequency, a first detector to which said carrier waves are applied, a local oscillator, the output of said local oscillator being coupled to said first detector for converting said television signals to intermediate frequency waves, a common intermediate frequency amplifier having a predetermined frequency response characteristic, a second detector coupled to the output of said intermediate frequency amplifier for producing an intercarrier sound wave having a frequency equal to the difference between said first and second frequencies and having an amplitude varying as a function of the positions of said intermediate frequency waves with respect to said predetermined frequency response characteristic, means including a reverse biased rectifier for deriving a first voltage which varies as a function of intercarrier signal amplitudes within a predetermined amplitude range defined by first and second intercarrier signal amplitude levels, detector means including a second reverse biased rectifier for deriving a second voltage which varies as a function of intercarrier signal amplitude variations exceeding said second amplitude level, means for subtractively combining said first and second voltages to produce a control signal which varies as a direct function of intercarrier signal amplitudes within said predetermined range and as a different function of amplitudes exceeding said second level, and means for applying said control signal to regulate the frequency of said local oscillator whereby the frequency of said oscillator is automatically shifted to and maintained at frequency values such that said intermediate frequency sound carrier is maintained at a predetermined location with respect to said frequency response characteristic.

6. An intercarrier sound television receiver for utilizing a picture carrier amplitude modulated with video information and for concurrently utilizing a sound carrier having a fixed frequency separation from said picture carrier and frequency modulated with sound information, said receiver comprising: a first detector including a tunable heterodyning oscillator for converting said carriers to intermediate-frequency picture and sound signals; an intermediate-frequency channel coupled to said first detector and presenting a sloping frequency-response characteristic to said sound signal; a second detector coupled to said channel for deriving an intercarrier signal of fixed frequency from said picture and sound signals; means coupled to said second detector and including first reverse bias rectifier means responsive to intercarrier signal amplitudes within a predetermined amplitude range to produce a first control potential of a polarity tending to increase the frequency of said oscillator and second reverse biased rectifier means responsive to signal amplitudes exceeding said range to produce a second control potential of a polarity tending to decrease the frequency of said oscillator, and means for additively combining and applying said first and second control potentials to dynamically stabilize said oscillator at a frequency such that the amplitude of said intercarrier signal is maintained substantially at the upper limit of said amplitude range.

References Cited in the file of this patent

UNITED STATES PATENTS

| | | |
|---|---|---|
| 1,813,923 | Heising | July 13, 1931 |
| 2,509,337 | Earp | May 30, 1950 |
| 2,539,042 | Toporeck | Jan. 23, 1951 |
| 2,632,047 | Schlesinger | Mar. 17, 1953 |
| 2,664,464 | Cotsworth | Dec. 29, 1953 |
| 2,677,049 | Rogers | Apr. 27, 1954 |
| 2,714,132 | Fredendall | July 26, 1955 |
| 2,730,616 | Bastow | Jan. 10, 1956 |